(12) United States Patent
You

(10) Patent No.: US 12,109,960 B2
(45) Date of Patent: Oct. 8, 2024

(54) PASSENGER SEAT CONTROL SYSTEM AND METHOD

(71) Applicants: Hyundai Motor Company, Seoul (KR); Kia Corporation, Seoul (KR)

(72) Inventor: Jung-Keun You, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 258 days.

(21) Appl. No.: 17/528,547

(22) Filed: Nov. 17, 2021

(65) Prior Publication Data
US 2022/0203913 A1    Jun. 30, 2022

(30) Foreign Application Priority Data
Dec. 30, 2020   (KR) .................. 10-2020-0187818

(51) Int. Cl.
| | | |
|---|---|---|
| *B60R 16/00* | (2006.01) | |
| *B60N 2/02* | (2006.01) | |
| *B60N 2/12* | (2006.01) | |
| *B60R 1/07* | (2006.01) | |
| *B60R 16/037* | (2006.01) | |
| *B60N 2/00* | (2006.01) | |
| *B60R 22/20* | (2006.01) | |

(52) U.S. Cl.
CPC ........ *B60R 16/037* (2013.01); *B60N 2/02246* (2023.08); *B60N 2/0244* (2013.01); *B60N 2/12* (2013.01); *B60R 1/07* (2013.01); *B60N 2/002* (2013.01); *B60N 2/0268* (2023.08); *B60R 22/20* (2013.01)

(58) Field of Classification Search
CPC ......... B60R 16/037; B60R 1/07; B60R 22/20; B60N 2/02246; B60N 2/0244; B60N 2/12; B60N 2/0268; B60N 2/002

USPC .......................................... 701/49
See application file for complete search history.

(56) References Cited

U.S. PATENT DOCUMENTS

| | | | |
|---|---|---|---|
| 2018/0354440 A1* | 12/2018 | Pouliquen ............ | G06V 20/593 |
| 2023/0135176 A1* | 5/2023 | Yang ........................ | B60N 2/56 |
| | | | 701/36 |

OTHER PUBLICATIONS

Porsche Melbourne, "Adjusting your Porsche Passenger seat from the Drivers seat!," Nov. 21, 2020, YouTube.com, whole video. (Year: 2020).*
Porsche, "Video Tutorials for your Porsche," 2018, Porsche.com, whole website including all videos and attached documents. (Year: 2018).*

* cited by examiner

*Primary Examiner* — Tiffany P Young
(74) *Attorney, Agent, or Firm* — Slater Matsil, LLP

(57) ABSTRACT

A system for controlling a passenger seat of a vehicle includes a driver's seat control switch, a passenger seat control switch, an outside mirror control switch, and a control unit for coupled to receive switch input signals from the driver's seat control switch, the passenger seat control switch, and the outside mirror control switch and to drive a driver's seat control motor, a passenger seat control motor, an outside mirror control motor. The control unit is configured to drive the passenger seat control motor according to a switch input signal of the driver's seat control switch when the driver's seat control switch is electrically connected in an ON state for a predetermined time immediately after the outside mirror control switch is pressed.

20 Claims, 5 Drawing Sheets

PASSENGER SEAT CONTROL SYSTEM AND METHOD

CROSS-REFERENCE TO RELATED APPLICATIONS

This application claims the benefit of Korean Patent Application No. 10-2020-0187818, filed in the Korean Intellectual Property Office on Dec. 30, 2020, which application is hereby incorporated herein by reference.

TECHNICAL FIELD

The present invention relates to a passenger seat control system and a method operable in the driver's seat.

BACKGROUND

In general, the passenger seat of a vehicle refers to the seat located on the right side of the driver's seat in the U.S. When there is a passenger in the passenger's seat while the vehicle is operating, the driver will experience a situation in which the passenger lowers his/her head due to drowsiness and the like.

In this case, an uncomfortable posture, such as the passenger's head continuing to bend in only one direction, is maintained for a long time, so when the passenger wakes up from napping, the head of the passenger may be ache or other areas of the passenger may have stiffness.

Accordingly, when the passenger is sleeping in an unstable posture in the passenger seat, it is desirable to adjust the angle of the backrest of the passenger, the position of the seat in the front or rear directions, or the like. However, since a seat control switch of the passenger seat is generally mounted to a right lower side (the door side of the vehicle) of a seat frame of the passenger seat in the related art, there is a problem in that it is impossible for the driver to directly control the passenger seat by extending his/her arm while driving.

In some high-end vehicles, there were cases where a switch to control the passenger seat was installed on the left side (driver's seat side) of the seat backrest of the passenger seat. This is not a function that is used frequently and there is a disadvantage in that the manufacturing cost is increased due to the addition of separate materials and assembly man-hours for the function.

SUMMARY

Embodiments of the present invention relate to a system and a method of controlling a passenger seat of a vehicle. In particular examples, the disclosure relates to a system and a method of controlling a passenger seat, in which if the driver operates a driver's seat control switch within a predetermined time after pressing an outside mirror control switch, a control unit recognizes the press of the outside mirror control switch as the control of a passenger seat control motor by using a manipulation signal of a driver's seat control switch and adjusts reclining of a backrest of the passenger seat, a position of the passenger seat in front and rear directions, and the like according to an input signal of the driver's seat control switch. This feature enables a driver to easily control the passenger seat and facilitating convenience to a passenger in the passenger seat.

Embodiments can solve problems discussed in the background by providing a system and a method of controlling a passenger seat in which a driver is capable of conveniently controlling a passenger seat in a driver's seat so as to increase convenience of a passenger seated in the passenger seat.

An exemplary embodiment of the present invention provides a system and a method of controlling a passenger seat operable in a driver's seat, in which if the driver operates a driver's seat control switch within a predetermined time after pressing an outside mirror control switch, a control unit recognizes the press of the outside mirror control switch as the control of a passenger seat control motor by using a manipulation signal of a driver's seat control switch and adjusts reclining of a backrest of the passenger seat, a position of the passenger seat in front and rear directions, and the like according to an input signal of the driver's seat control switch.

According to the system and the method of controlling the passenger seat operable in the driver's seat of the present invention, separate materials and assembly man-hours are not required, so that it is possible to conveniently adjust an angle of a backrest of a passenger seat or a position of the passenger seat in front and rear directions at a driver's seat without increasing the manufacturing cost, thereby improving convenience of a passenger seated in the passenger seat.

DETAILED DESCRIPTION OF ILLUSTRATIVE EMBODIMENTS

Figure 1:
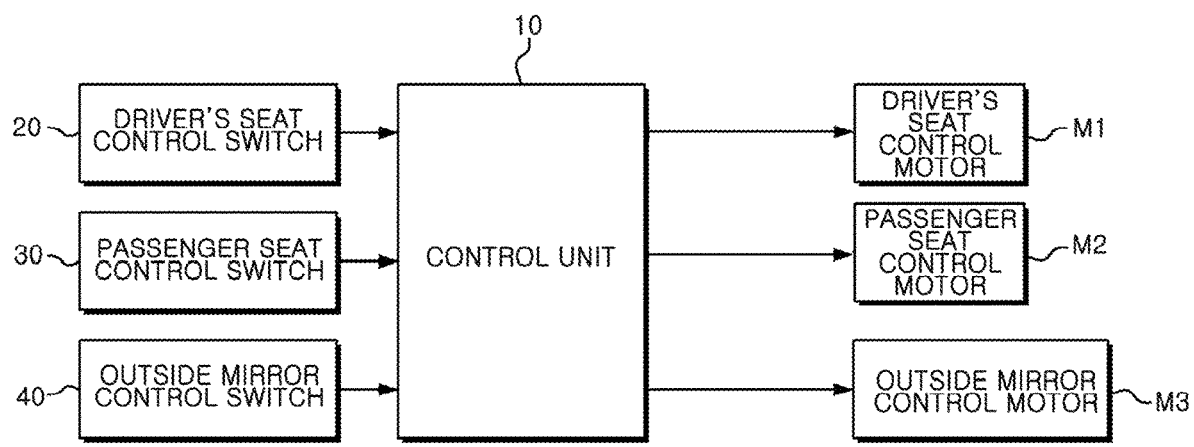
FIG. 1 is a block diagram illustrating a system for controlling a passenger seat of an embodiment of the present invention.

Hereinafter, a configuration of a system and a method of controlling a passenger seat operable in a driver's seat of the present invention will be described in detail with reference to the drawing.

However, the disclosed drawings are provided as an example for fully delivering the spirit of the present invention to those skilled in the art. Accordingly, the present invention is not limited to the drawings presented below, and may also be specified in other aspects.

Further, unless otherwise defined, the terms used in the specification of the present invention have the meanings commonly understood by those skilled in the art, and the detailed descriptions of well-known functions and configurations may be omitted in the description below and the accompanying drawings to avoid unnecessarily obscuring the subject matter of the present invention.

FIG. 1 is a block diagram illustrating a system for controlling a passenger seat of the present invention, and FIG. 2 is diagram illustrating an example of an outside mirror control switch and a driver's seat control switch installed in a driver's seat used in the system for controlling the passenger seat of the present invention.

The system for controlling the passenger seat of the present invention is a system in which if the driver operates a driver's seat control switch within a predetermined time after pressing an outside mirror control switch attached to a driver's door module (DDM), a control unit controls a passenger seat control motor by using an operation signal of a driver's seat control switch to adjust reclining of a backrest of the passenger seat, a position of the passenger seat in the front and rear directions, and the like, and is a system which enables a driver to conveniently control the passenger seat.

Referring to FIG. 1, the system for controlling the passenger seat of the present invention includes a driver's seat control switch 20 for manipulating a driver's seat control motor M1, a passenger seat control switch 30 for manipulating a passenger seat control motor M2, an outside mirror control switch 40 for manipulating an outside mirror control motor M3, and a control unit 10 for receiving switch input signals of the driver's seat control switch 20, the passenger seat control switch 30, and the outside mirror control switch 40 to drive the driver's seat control motor M1, the passenger seat control motor M2, and the outside mirror control motor M3 according to the input signal, and if the driver's seat control switch 20 is operated within a predetermined time immediately after the outside mirror control switch 40 is pressed, the control unit 10 drives the passenger seat control motor M2 according to the switch input signal of the driver's seat control switch 20.

Preferably, in the state where the driver's seat control switch 20 is operated within a predetermined time immediately after the right outside mirror control switch (see R of FIG. 2B) of the outside mirror control switch 40 is pressed, the control unit 10 drives the passenger seat control motor M2 according to the switch input signal of the driver's seat control switch 20.

In the exemplary embodiment of the present invention, only when the switch input signal of the driver's seat control switch 20 is input within 5 seconds immediately after the right outside mirror control switch of the outside mirror control switch 40 is pressed, the control unit 10 drives the passenger seat control motor M2 according to the switch input signal, to clearly divide a driver's operation for controlling the outside mirror and a driver's manipulation for controlling the driver's seat itself, thereby preventing confusion by the driver.

The driver's seat control motor M1 refers to all types of motors that are installed inside the driver's seat and adjust the position of the backrest of the driver's seat or the position in the front and rear directions of the seat, and includes, for example, a reclining motor for adjusting a reclining angle of the backrest of the driver's seat and a driver's seat position moving motor for adjusting the position of the driver's seat in the vehicle by moving the driver's seat in the front and rear directions.

The passenger seat control motor M2 refers to all types of motors that are installed inside the passenger seat and adjust the position of the backrest of the driver's seat or the position of the seat in the front and rear directions, and includes, for example, a reclining motor for adjusting a reclining angle of the backrest of the passenger seat and a passenger seat position moving motor for adjusting the position of the passenger seat in the vehicle by moving the passenger seat in the front and rear directions.

The outside mirror control motor M3 is the motor that is installed inside the outside mirrors attached to both sides of the vehicle and adjusts a viewing angle of the outside mirror.

The control unit 10 may be a control unit of a Driver's Door Module (DDM) installed in the door at the driver's seat side of the vehicle, or an Electronic Control Unit (ECU) for the combined control of the vehicle, and preferably, the control unit of the driver's door module.

Figure 2A:
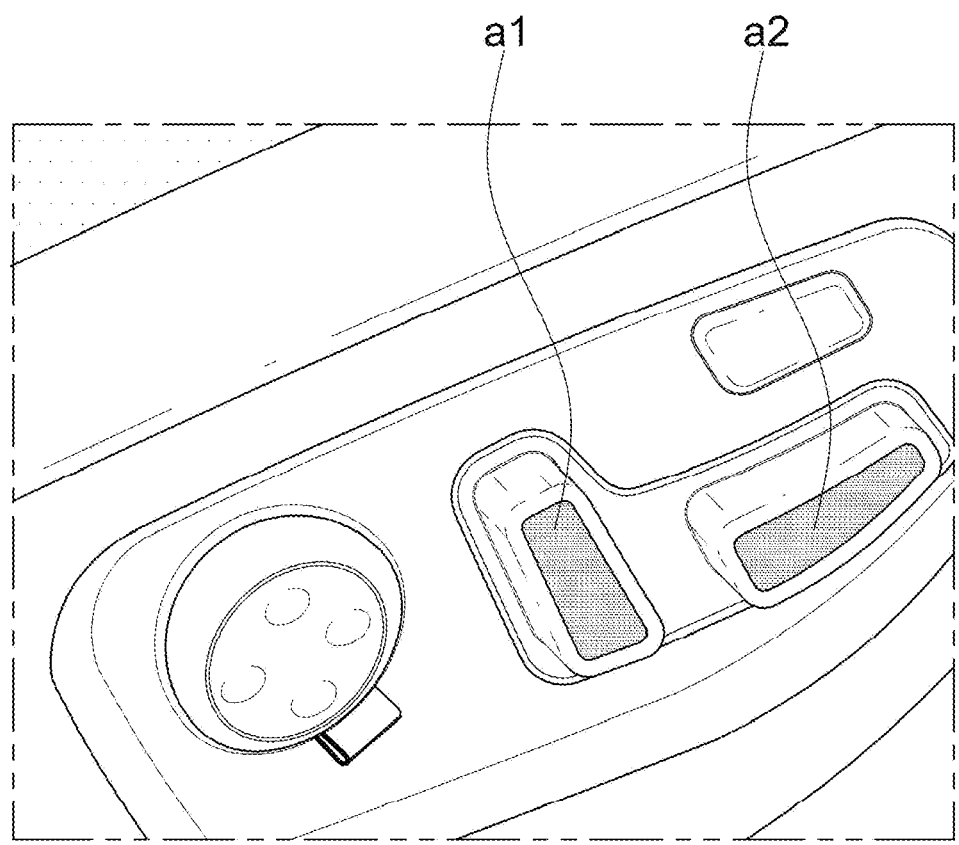
FIGS. 2A and 2B (collectively FIG. 2) illustrate an example of a driver's seat control switch (FIG. 2A) and an outside mirror control switch (FIG. 2B) installed in a driver's seat used in the system for controlling the passenger seat of an embodiment of the present invention.
Figure 2B:
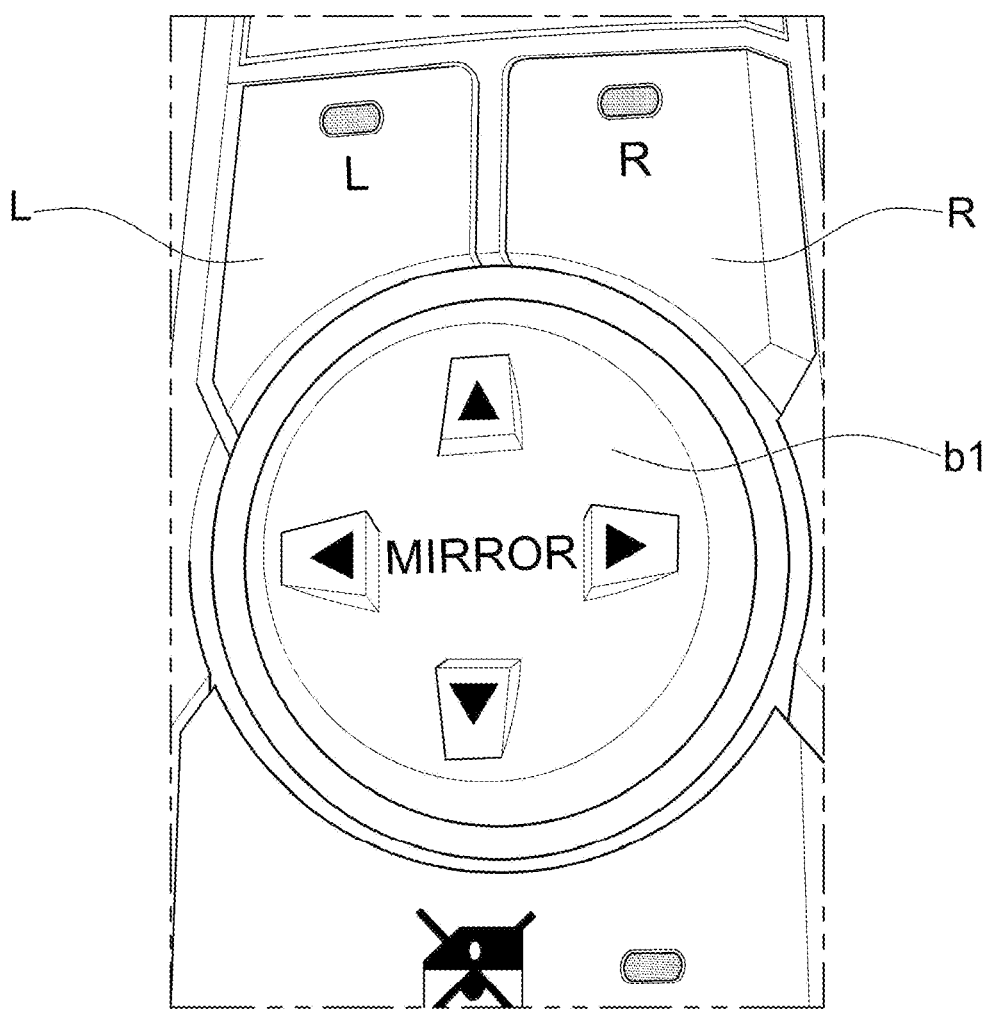

FIGS. 2A and 2B illustrate an example of the driver's seat control switch and the outside mirror control switch installed in the driver's seat used in the system for controlling the passenger seat of the present invention.

The driver's seat control switch 20 of the present invention collectively refers to switches for adjusting an angle of the backrest of the driver's seat or the position of the driver's seat in the front and rear directions, such as a reclining angle control switch a1 of the backrest of the driver's seat and a front and rear-directional position control switch a2 of the driver's seat, as illustrated in FIG. 2A, and includes all types of published driver's seat control switches.

The outside mirror control switch 40 of the present invention collectively refers to a right outside mirror control switch L and a left outside mirror control switch R of the vehicle, and a control switch bi for adjusting an angle of a selected outside mirror, as illustrated in FIG. 2B, and includes all types of published outside mirror control switches.

In the meantime, although not illustrated, the passenger seat control switch 30 described herein collectively refers to switches for adjusting an angle of the backrest of the passenger seat or a position of the passenger seat in the front and rear directions, such as a reclining angle control switch of the backrest of the passenger seat and a front and rear directional position control switch of the passenger seat, having the configuration illustrated in FIG. 2A, and includes all types of published passenger seat control switches.

Figure 3:
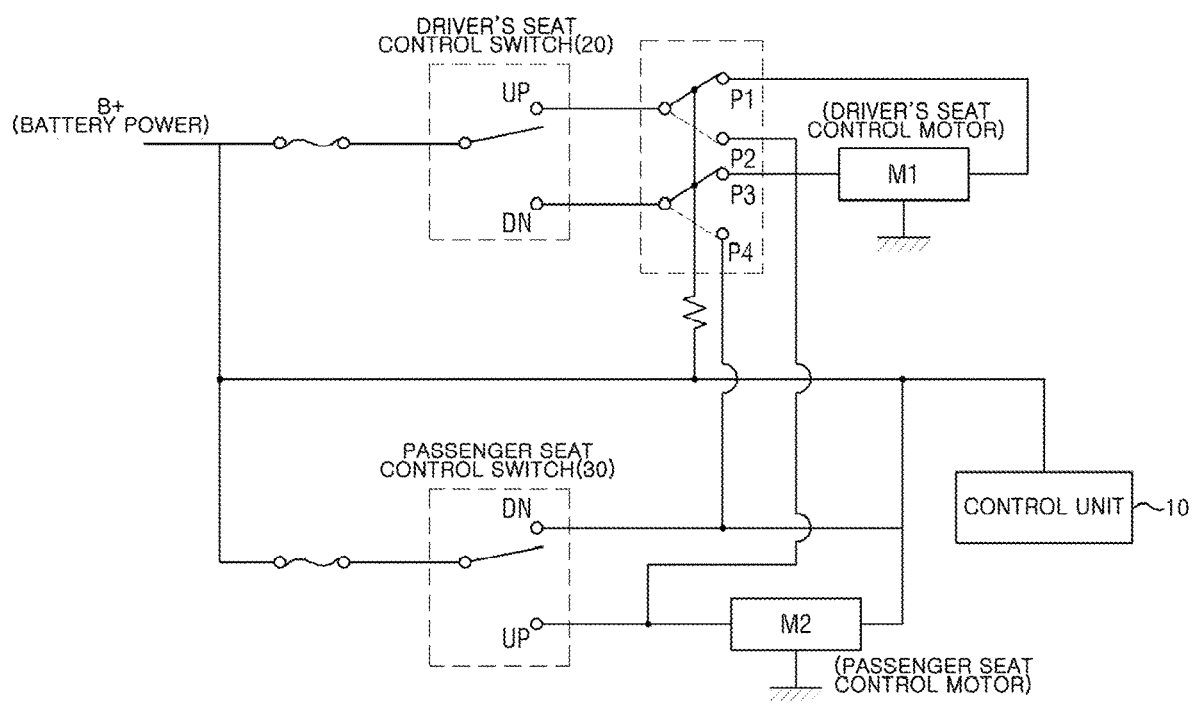
FIG. 3 is a circuit diagram illustrating a connection state of the system for controlling the passenger seat of an embodiment of the present invention.

FIG. 3 is a circuit diagram illustrating a connection state of the system for controlling the passenger seat of the present invention.

The system for controlling the passenger seat of the present invention has an electric connection state like the illustrated circuit diagram in order to drive the passenger seat control motor M2 according to the switch input signal of the driver's seat control switch 20 in the case where the outside mirror control switch 40 is electrically connected in the ON state.

The driving of the circuit of the system of the exemplary embodiment of the present invention will be described in detail. The driver's seat control switch 20, to which battery power (B+) is applied, includes an upward terminal UP and a downward terminal DN which are switched according to a manipulation, and when a contact of the switch 20 is connected to the upward terminal UP according to the connection to the upward terminal UP or the downward terminal DN, the battery power is applied to one end of the driver's seat control motor M1 through a first contact P1, so that the motor M1 is driven in a forward direction to move the reclining angle of the backrest of the driver's seat in the upper direction or move the position of the driver's seat in the front direction, and when the contact of the switch 20 is connected to the downward terminal (DN), the battery power is applied to the other end of the motor M1 through a third contact P3, so that the motor M1 is driven in a reverse direction to move the reclining angle of the backrest of the driver's seat in the lower direction or move the position of the driver's seat in the rear direction.

Similarly, the passenger seat control switch 30, to which battery power (B+) is applied, includes an upward terminal UP and a downward terminal DN which are switched according to a manipulation, and when a contact of the switch 30 is connected to the downward terminal DN according to the connection to the upward terminal UP or the downward terminal DN, the battery power is applied to one end of the passenger seat control motor M2 through the downward terminal DN of the switch, so that the motor M2 is driven in a forward direction to move the reclining angle of the backrest of the passenger seat in the lower direction or move the position of the passenger seat in the rear direction, and when the contact of the switch 30 is connected to the upward terminal UP, the battery power is applied to the other end of the motor M2 through the upward terminal UP, so that the motor M2 is driven in a reverse direction to move the reclining angle of the backrest of the passenger seat in the upper direction or move the position of the passenger seat in the front direction.

In this case, if the driver's seat control switch 20 is operated within a predetermined time immediately after the outside mirror control switch 40 is pressed in order to control the passenger seat for convenience of the passenger in the passenger seat, the control unit 10 determines the switching signal of the driver's seat control switch 20 as a switching signal for controlling the passenger seat, and performs switching for connecting the rear end of the upward terminal UP of the driver's seat control switch 20 to a second contact P2 and performs switching for connecting the rear end of the downward terminal DN of the driver's seat control switch 20 to a fourth contact P4.

Since the second contact P2 is in the state of being connected to the other end of the passenger seat control motor M2 and the fourth contact P4 is in the state of being connected to one end of the passenger seat control motor M2, in the state where the rear ends of the upward terminal UP and the lower terminal DN of the driver's seat control switch 20 are switched to the second contact P2 and the fourth contact P4, respectively, when the contact of the driver's seat control switch 20 is connected to the upward terminal UP, the battery power is applied to one end of the passenger seat control motor M2 through the second contact P2, so that the motor M2 is driven in the forward direction to move the reclining angle of the backrest of the passenger seat in the upper direction or move the position of the passenger seat in the front direction, and when the contact of the driver's seat control switch 20 is connected to the downward terminal DN, the battery power is applied to the other end of the passenger seat control motor M2 through the fourth contact P4, so that the passenger seat control motor M2 is driven in the reverse direction to move the reclining angle of the backrest of the passenger seat in the lower direction or move the position of the passenger seat in the rear direction.

Accordingly, through the foregoing operation, the driver is capable of controlling the passenger seat for convenience of the passenger in the passenger seat.

Next, control of the system for controlling the passenger seat of the present invention including the foregoing configuration will be described.

Figure 4:
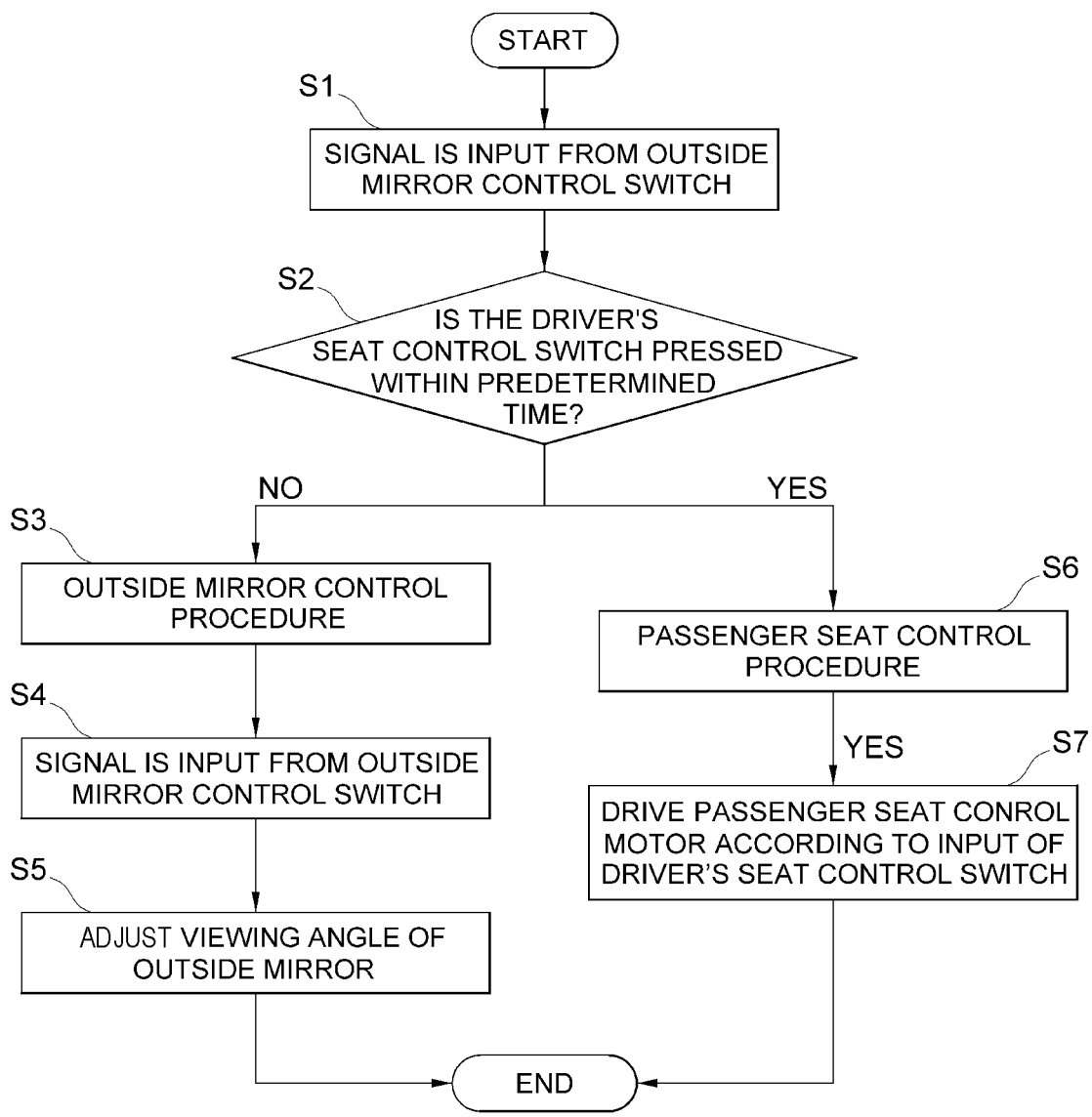
FIG. 4 is a flowchart illustrating a method of controlling a passenger seat of an embodiment of the present invention.

FIG. 4 is a flowchart illustrating a method of controlling a passenger seat of the present invention.

The method of controlling a passenger seat of the present invention is implemented in the system including the driver's seat control switch 20 for controlling the driver's seat control motor M1, the passenger seat control switch 30 for controlling the passenger seat control motor M2, the outside mirror control switch 40 for operating the outside mirror control motor M3, and the control unit 10 for receiving switch input signals of the driver's seat control switch 20, the passenger seat control switch 30, and the outside mirror control switch 40 to drive the driver's seat control motor M1, the passenger seat control motor M2, and the outside mirror control motor M3 according to the input signal.

First, when an input signal is input to the control unit 10 from the outside mirror control switch 40 (S1), the control unit 10 determines whether the driver's seat control switch 20 is pressed in an ON state within a predetermined time immediately after the outside mirror control switch 40 is pressed (S2).

If the driver's seat control switch 20 is not pressed in an ON state within the predetermined time in S2 step, the control unit 10 determines the input signal as a signal for controlling the outside mirror and recognizes the input signal as an outside mirror control procedure (S3), receives an operation signal of the outside mirror control switch 40 (S4), and adjusts a viewing angle of the outside mirror by driving the outside mirror control motor M3 (S5).

However, if the driver's seat control switch 20 is pressed in an ON state within the predetermined time in S2 step, the control unit 10 determines the input signal as a signal for controlling the passenger seat and recognizes the input signal as a passenger seat control procedure (S6).

In the exemplary embodiment of the present invention, when the switch input signal of the driver's seat control switch 20 is input within 5 seconds immediately after the right outside mirror control switch of the outside mirror control switch 40 is pressed, the control unit 10 determines the press as a press for controlling the passenger seat, and when the switch input signal of the driver's seat control switch 20 is more than 5 seconds, the control unit 10 determines the press as a press for controlling the outside mirror.

Next, after the control unit 10 recognizes the input signal as the passenger seat control procedure (S6) for controlling the passenger seat, the control unit 10 controls the passenger seat by driving the passenger seat adjustment motor M3 according to the input signal from the driver's seat control switch 20 (S7). The control of the passenger seat may be performed by adjusting a reclining angle of the backrest of the passenger seat or adjusting the front-rear position of the passenger seat.

Accordingly, according to the method of controlling the passenger seat of the present invention, when a passenger is sleeping in an unstable posture in the passenger seat, the driver conveniently adjusts the angle of the backrest of the passenger seat and the position of the seat in the front and rear directions by controlling the driver's seat control switch 20, thereby increasing convenience of the passenger in the passenger seat.

In order to prevent the driver from manipulating the passenger seat in the situation where the driver operates the vehicle at a high speed, after the control unit 10 recognizes the input signal as the passenger seat control procedure (S6), the control unit 10 determines whether a current vehicle speed of the vehicle is equal to or larger than a predetermined speed, and when the vehicle speed of the vehicle is equal to or larger than the predetermined speed (for example, when the vehicle speed is equal to or larger than 5 Km/h), the control unit 10 preferably automatically adjusts the reclining angle of the backrest of the passenger seat or the position of the passenger seat in the front and rear directions to a predetermined angle or position by pressing any one switch in the driver's seat control switch 20 once (namely, one-touch manipulation).

In order to prevent in advance from causing inconvenience to passengers in the rear seat of the vehicle due to the adjustment of the position of the backrest or the passenger seat when the driver manipulates the passenger seat in the driver's seat, after the control unit 10 recognizes the input signal as the passenger seat control procedure (S6), the control unit 10 receives a signal of a passenger detecting sensor embedded in the rear seat and determines whether the passenger exists in the rear seat, and when the passenger exists in the rear seat, the control unit 10 preferably automatically adjusts the reclining angle of the backrest of the passenger seat or the position of the passenger seat in the front and rear directions to a predetermined angle and a position so as not to cause inconvenience to the passenger seated in the rear seat by pressing any one switch in the driver's seat control switch 20 once (namely, one-touch manipulation).

After the control unit 10 recognizes the input signal as the passenger seat control procedure (S6), the control unit 10 automatically adjusts a height of a seat belt (safety belt) of the passenger in the passenger seat by linking the reclining angle of the backrest of the passenger seat and the position of the passenger seat in the front and rear directions adjusted during the manipulation of the passenger seat to improve safety of the passenger in the passenger seat.

In the foregoing, the system and method of controlling the passenger seat of the present invention have been described in detail with reference to the drawings, but the present invention is not limited thereto, and may also be specified in various aspects, and for example, the control of the passenger seat may also be performed through a menu manipulation of an application program of a smart phone of a user or an AVN device of a vehicle interlocked with the ECU of the vehicle.

What is claimed is:

1. A system for controlling a passenger seat of a vehicle, the system comprising:
    a driver's seat control switch;
    a passenger seat control switch;
    an outside mirror control switch; and
    a control unit for coupled to receive switch input signals from the driver's seat control switch, the passenger seat control switch, and the outside mirror control switch and to drive a driver's seat control motor, a passenger seat control motor, an outside mirror control motor,
    wherein the control unit is configured to drive the passenger seat control motor according to a switch input signal of the driver's seat control switch in response to detecting that the driver's seat control switch is electrically connected in an ON state for a predetermined time immediately after the outside mirror control switch is pressed, and
    wherein the control unit is configured to automatically adjust a height of a seat belt for the passenger seat according to a signal from the driver's seat control switch based on the driver's seat control switch being electrically connected in the ON state for a predetermined period of time immediately after the outside mirror control switch is pressed.

2. The system of claim 1, wherein the outside mirror control switch is a passenger-side outside mirror control switch.

3. The system of claim 1, wherein the passenger seat control motor is a motor configured to adjust a reclining angle of a backrest of the passenger seat.

4. The system of claim 1, wherein the passenger seat control motor is a motor configured to adjust a position of the passenger seat in front and rear directions relative to front and rear ends of the vehicle.

5. The system of claim 1, wherein the driver's seat control switch includes an upward terminal and a downward terminal of which a contact is switched according to a manipulation;
    wherein, when the driver's seat control switch is electrically connected in the ON state for the predetermined time immediately after the outside mirror control switch is pressed, the control unit is configured to perform switching for connecting a rear end of the upward terminal of the driver's seat control switch to a second contact connected with an other end of the passenger seat control motor, and to perform switching for connecting a rear end of the downward terminal of the driver's seat control switch to a fourth contact connected with one end of the passenger seat control motor;
    wherein, when the contact of the driver's seat control switch is connected to the upward terminal, battery power is applied to one end of the passenger seat control motor through the second contact, so that the passenger seat control motor is driven in a forward direction to control the passenger seat; and
    wherein, when the contact of the driver's seat control switch is connected to the downward terminal, battery power is applied to the other end of the passenger seat control motor through the fourth contact, so that the passenger seat control motor is driven in a reverse direction to control the passenger seat.

6. The system of claim 2, wherein the passenger seat control motor is a motor configured to adjust a reclining angle of a backrest of the passenger seat.

7. The system of claim 2, wherein the passenger seat control motor is a motor configured to adjust a position of the passenger seat in front and rear directions relative to front and rear ends of the vehicle.

8. A method of controlling a passenger seat of a vehicle, the method comprising:
    receiving an input signal from an outside mirror control switch, the input signal indicating that the outside mirror control switch has been pressed;
    determining whether a driver's seat control switch is pressed in an ON state within a predetermined time immediately after the outside mirror control switch has been pressed;
    when the driver's seat control switch has been pressed in the ON state within the predetermined time, operating in a passenger seat control procedure and controlling the passenger seat by driving a passenger seat control motor according to a signal from the driver's seat control switch to automatically adjust a height of a seat belt for the passenger seat; and
    when the driver's seat control switch has not been pressed in the ON state within the predetermined time, operating in an outside mirror control procedure and controlling an outside mirror by driving an outside mirror control motor.

9. The method of claim 8, wherein operating in the passenger seat control procedure comprises determining that a current vehicle speed of the vehicle is equal to or greater than a predetermined speed and automatically adjusting an angle and a position of the passenger seat to a predetermined angle and position in response to any one switch in the driver's seat control switch being pressed once.

10. The method of claim 8, wherein operating in the passenger seat control procedure comprises receiving a signal of a passenger detecting sensor embedded in a rear seat to determine whether a passenger exists in the rear seat and, when the passenger exists in the rear seat, automatically adjusting an angle and a position of the passenger seat to a predetermined angle and position in response to any one switch in the driver's seat control switch being pressed once.

11. A vehicle comprising:
a driver's seat;
a passenger seat;
an outside mirror;
a driver's seat control motor coupled to the driver's seat;
a passenger seat control motor coupled to the passenger seat;
an outside mirror control motor coupled to the outside mirror;
a driver's seat control switch coupled to the driver's seat control motor through a control unit;
a passenger seat control switch coupled to the passenger seat control motor through the control unit; and
an outside mirror control switch coupled to the outside mirror control motor through the control unit;
wherein, in response to a signal from the outside mirror control switch, the control unit is configured to drive either the passenger seat control motor or the outside mirror control motor depending upon whether a further signal is received from the driver's seat control switch after receipt of the signal from the outside mirror control switch; and
wherein the control unit is configured to automatically adjust a height of a seat belt for the passenger seat according to a signal from the driver's seat control switch based on the driver's seat control switch being electrically connected in an ON state for a predetermined period of time immediately after the outside mirror control switch is pressed.

12. The vehicle of claim 11, wherein the control unit is configured to drive the passenger seat control motor in response to the further signal being received from the driver's seat control switch within a predetermined time after receipt of the signal from the outside mirror control switch.

13. The vehicle of claim 11, wherein the control unit is configured to drive the passenger seat control motor in response to the further signal being received from the driver's seat control switch for a predetermined time immediately after receipt of the signal from the outside mirror control switch.

14. The vehicle of claim 13, wherein the predetermined time is five seconds.

15. The vehicle of claim 11, wherein the control unit is configured to drive the passenger seat control motor according to the further signal from the driver's seat control switch in response to the driver's seat control switch being electrically connected in an ON state for a predetermined time immediately after the outside mirror control switch is pressed.

16. The vehicle of claim 11, wherein the outside mirror is a passenger side outside mirror.

17. The vehicle of claim 11, wherein the passenger seat control motor comprises a motor configured to adjust a reclining angle of a backrest of the passenger seat.

18. The vehicle of claim 11, wherein the passenger seat control motor comprises a motor configured to adjust a position of the passenger seat in front and rear directions relative to front and rear ends of the vehicle.

19. The vehicle of claim 11, wherein the passenger seat control motor comprises a motor configured to adjust a reclining angle of a backrest of the passenger seat and a motor configured to adjust a position of the passenger seat in front and rear directions relative to front and rear ends of the vehicle.

20. The vehicle of claim 11, wherein the driver's seat control switch includes an upward terminal and a downward terminal of which a contact is switched according to a manipulation;
wherein, in response to the driver's seat control switch being electrically connected in an ON state for a predetermined time immediately after the outside mirror control switch is pressed, the control unit is configured to perform switching for connecting a rear end of the upward terminal of the driver's seat control switch to a second contact connected with an other end of the passenger seat control motor, and to perform switching for connecting a rear end of the downward terminal of the driver's seat control switch to a fourth contact connected with one end of the passenger seat control motor;
wherein, when the contact of the driver's seat control switch is connected to the upward terminal, battery power is applied to one end of the passenger seat control motor through the second contact, so that the passenger seat control motor is driven in a forward direction to control a passenger seat; and
wherein, when the contact of the driver's seat control switch is connected to the downward terminal, battery power is applied to the other end of the passenger seat control motor through the fourth contact, so that the passenger seat control motor is driven in a reverse direction to control the passenger seat.

* * * * *